United States Patent [19]

Driver

[11] 4,415,774
[45] Nov. 15, 1983

[54] LINE POWERED MODEM AUTOMATIC ANSWER DEVICE POWERED FROM EQUIPMENT

[75] Inventor: R. Byron Driver, Huntsville, Ala.

[73] Assignee: Universal Data Systems, Inc., Huntsville, Ala.

[21] Appl. No.: 324,842

[22] Filed: Nov. 25, 1981

[51] Int. Cl.³ .......................................... H04M 11/00
[52] U.S. Cl. ................................................. 179/2 DP
[58] Field of Search .......... 179/2 DP, 2 C, 6.12–6.16; 375/8

[56] References Cited

U.S. PATENT DOCUMENTS

| | | | |
|---|---|---|---|
| 4,306,116 | 12/1981 | McClure et al. | 179/2 DP |
| 4,366,347 | 12/1982 | Takatsuki et al. | 179/2 DP |
| 4,373,117 | 2/1983 | Pierce | 179/2 DP |

Primary Examiner—G. Z. Rubinson
Assistant Examiner—W. J. Brady
Attorney, Agent, or Firm—Weingarten, Schurgin, Gagnebin & Hayes

[57] ABSTRACT

An automatic answering device controlled by attached data equipment and used with a modem powered from the telephone line. The modem and automatic answering device are automatically connected to and subsequently powered by the telephone line when a ring signal has occurred on the telephone line and the data equipment has indicated that it is ready to receive data. The energy needed to connect the modem to the telephone line is slowly accumulated from a data equipment over a period of time prior to the connection of the modem to the telephone line. The modem automatically hangs up when the local data equipment signals disconnect or the modem at the other end of the telephone line disconnects.

9 Claims, 2 Drawing Figures

LINE POWERED MODEM AUTOMATIC ANSWER DEVICE POWERED FROM EQUIPMENT

FIELD OF THE INVENTION

This invention relates to answering devices associated with line powered modems, and more particularly to automatic answering equipment which accumulates initial answering energy from the data equipment systems to which they are connected.

BACKGROUND OF THE INVENTION

For data transmission on a standard voice grade telephone line, a modem is employed at each end of the telephone line. The modem is generally manually connected to the telephone line or automatically connected to the telephone line by appropriate connecting circuits. These connecting circuits may place the modem in an answering mode or an originating mode, which circuits accordingly alter the internal characteristics of each of the two communicating modems so that the data may be transmitted therebetween without interference or distortion. In addition, the modems become connected to or disconnected from the telephone lines according to a predetermined answering and disconnect protocol.

The modem and the associated answering circuits require a power supply which is usually operative from an AC power outlet or a battery source. In many instances the AC power source is not conveniently available, or in the case of a battery source, the modem may be in a location where battery monitoring or replacement is inconvenient. Additionally, the power supply adds to the expense and size of the modem. Therefore, to dispense with the need for any separate modem power supply or access to a separate power source, it is advantageous to provide power for the operation of the modem, and particularly its associated answering circuits, from both the telephone line and its associated data equipment over the existing connecting signal leads.

A modem is disclosed in a first copending application of O. Leon Pierce, Mark C. Smith and R. Byron Driver, entitled Line Powered Modem, Ser. No. 203,108, now U.S. Pat. No. 4,395,590 filed on Nov. 3, 1980 and assigned to the same assignee as this invention, in which the entire operating power for the modem circuits is derived from the available telephone line power.

In a second copending application of O. Leon Pierce, entitled Switchable Line Powered Modem, Ser. No. 203,111, filed on Nov. 3, 1980 and assigned to the same assignee as this invention, a modem is provided which derives its entire operating power from the available telephone line power in a manner similar to that described in the aforesaid copending application. Furthermore, the switchable line powered modem is selectively operable in an originate or answer mode for data transmission and reception in either of two operating frequency bands. The modem includes an interface and power source for coupling both signals from the telephone line to the modem for demodulation and signals from the modem to the telephone line for transmission.

SUMMARY OF THE INVENTION

The present invention comprises an automatic answering device for use with telephone line powered modems. In general, the connected data equipment, which includes data terminals and computers, provides a modem answer control signal which has either a no-answer state or an answer state, where the modem answer control signal is only intended to continuously drive the modem logic inputs. However, in the present invention, the modem answer control signal is accumulated by a storage device over several seconds so as to provide the initial supply of energy used by the automatic answering device to answer a call. Upon receipt of a ringing signal from the telephone line and the condition of an answer state of the modem answer control signal, the automatic answer device will automatically connect the modem to and subsequently derive power from the telephone line without using an external power supply.

The automatic answering device includes a ring detector which generates a ring indicator signal when the telephone line introduces a ringing signal. An answer control circuit produces a relay answer signal when it receives the data terminal ready signal (in the answer state) and the ring indicator signal. An answer relay selectively connects the telephone line to the modem when the relay answer signal is generated. Energy from the modem answer control signal is accumulated and later connected to power the answer relay. In addition, energy from other data equipment signals is also received and accumulated for use by the answer device before the modem is connected to the telephone line.

Alternately, the modem is operable to originate a call by switching a telephone line switch in the modem to connect the telephone line 11 to a conventional telephone or handset having an interrupt dialer or other standard telephone dialing means, where the operator manually establishes the telephone circuit. Thereafter, the modem telephone line switch is switched to a data mode which is further operable in an originate mode to originate data tramsmission in contrast to the answer mode, according to the selection of the mode by the corresponding position of an answer/originate switch.

Moreover, the automatic answer device according to the present invention will automatically disconnect the modem from the telephone line upon the change of the modem answer control signal to the no-answer state or upon an indication of loss of signal (carrier) from the communicating modem. Standard handshaking protocol and signal delay sequences are employed according to accepted telephone and telecommunications format standards.

BRIEF DESCRIPTION OF THE DRAWINGS

These and other features of the present invention are better and more fully understood when taken together with the following detailed description of the drawings, in which.

DETAILED DESCRIPTION OF THE INVENTION

Figure 1:
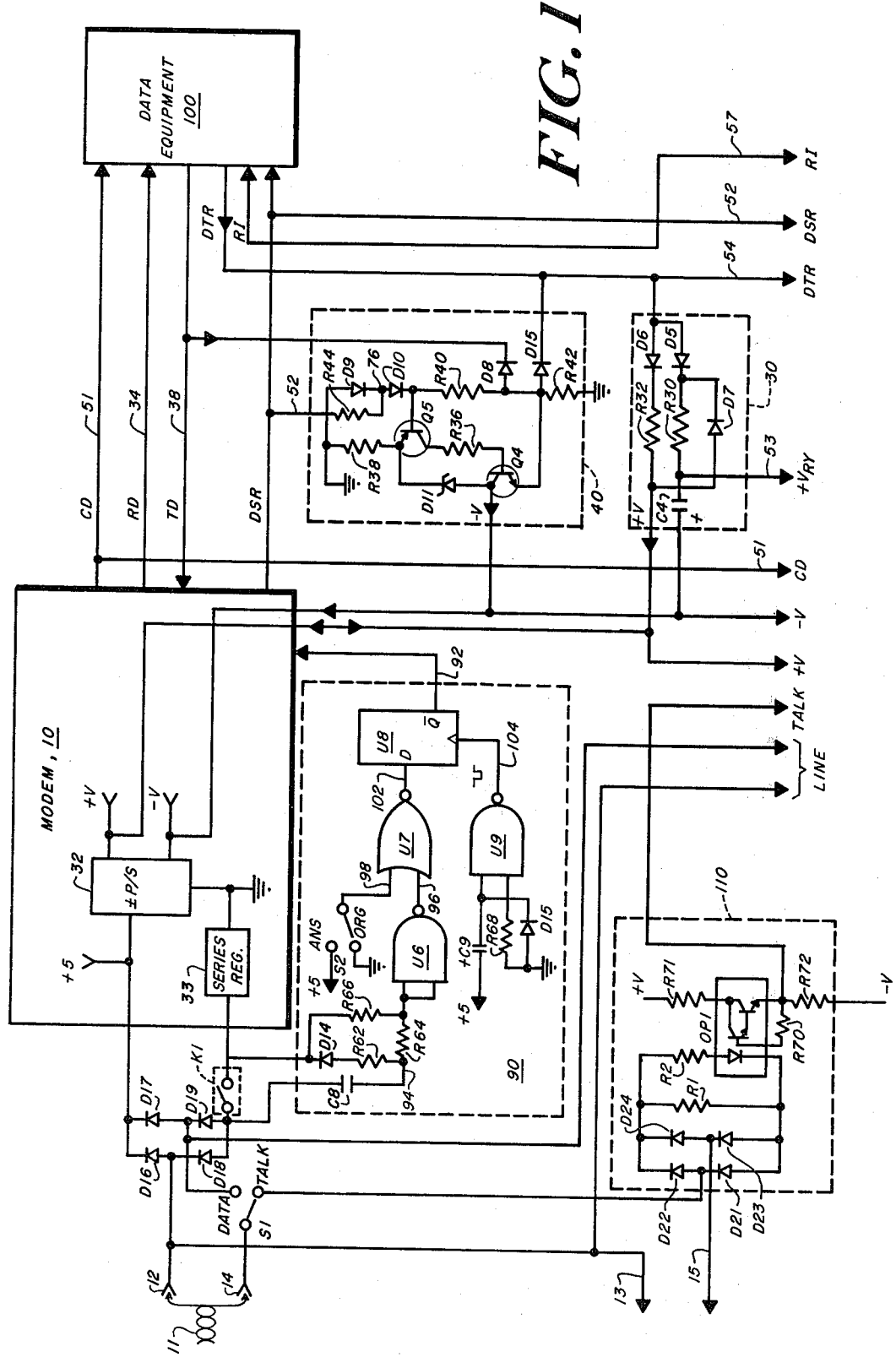
FIGS. 1 and 2 together constitute a schematic diagram of the modem of the present invention. The leads designated as LINE, TALK, +V, −V, +$V_{RY}$, CD, DTR and DSR in FIG. 1 are, for an understanding of the discussion which follows, connected to the respectively marked leads in FIG. 2.
Figure 2:
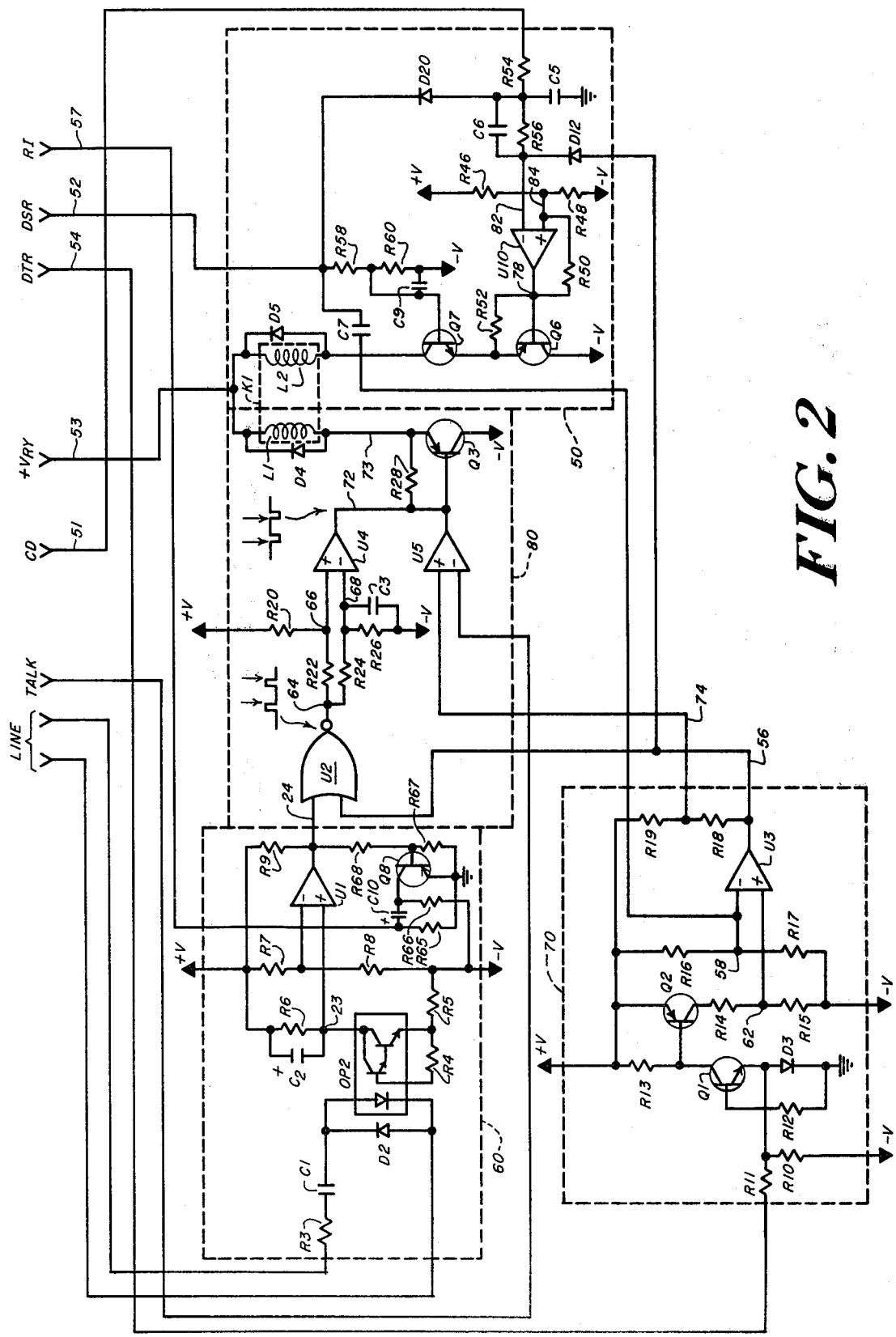

The schematic diagram of the automatic answering device is shown in FIGS. 1 and 2. A telephone line 11 and data equipment 100 are connected according to a predetermined electrical format and signaling sequence. The telephone line 11, which includes a pair of leads, is connected to terminals 12 and 14 of FIG. 1. According to accepted U.S. telephone standards, the telephone line will provide a continuous DC potential and a ring signal, the latter consisting of high-voltage AC, typically at 20 Hz. A handset or standard telephone (not shown) is connected to the modem at terminals 13 and 15, which are in turn connected to the telephone line 11 by switch S1 when in the "talk" position, as shown (the effect of circuit 110 is not significant to the operation of the telephone at leads 13 and 15, here). With switch S1 in the "talk" position and the ring signal present, the handset or telephone passes the higher voltage signal to a bell ringer which in turn rings, indicating the unit is being called. In the conventional manner, the user then answers the telephone by closing a hook switch by lifting the receiver from the cradle, commonly termed the "off-hook" condition. When "off-hook," the telephone handset presents a resistance of approximately 600-900 ohms across the two leads of the telephone line, lower than the bell ringer. With the 600-900 ohm resistance across the telephone leads 13 and 15, the ringing ceases and the telephone line presents the DC potential along with any signals transmitted by the calling party. Thereafter, the local user, through the telephone equipment, returns a modem data signal to the calling party.

With the switch S1 in the "data" position, the modem 10 of the present invention replaces the user in the communications procedure by automatically answering the telephone call. The modem 10 demodulates the received signals from the telephone line 11 and provides a digital "received data," or RD signal on lead 34, which is in turn transmitted to the data equipment 100. In the opposite direction the modem 10 modulates the digital "transmitted data," or TD signal coming from the data equipment 100 on lead 38 to a form appropriate for transmission over the telephone line 11. In addition, the data equipment 100 provides a control signal known as the "data terminal ready," or DTR signal, to the modem automatic answer device of the present invention on lead 54. The DTR signal on lead 54 instructs the modem to either answer or not answer when the telephone line presents a ring signal. After the modem answers, a change of the DTR signal causes the modem to hang-up.

In FIG. 2, a ring detector circuit 60 is connected to the telephone line terminals 12 and 14 of FIG. 1 via "line" inputs to generate a ring indicator signal at output 24 when the ring signal is present on the telephone line. A relay answer signal at relay set winding lead 73 (in section 50) is produced upon both the loss of the ring indicator signal from output 24 and the receipt of the modem answer signal (DTR) 54 in the answer state. The modem 10 connection to the telephone line 11 of FIG. 1 is completed by closure of an answer relay K1, which places the modem 10 in an "off-hook" condition in response to the relay answer signal at relay K1 set winding lead L1. Until the modem 10 is in the answer mode, all the power which energizes the answer relay K1 contacts is accumulated from the data equipment 100 through the signal leads, including specifically the DTR leads 54, connected to the modem automatic answer circuits. After the relay K1 contacts are closed, placing the modem 10 in an "off-hook" condition, the modem 10 is powered by the DC potential appearing the telephone leads 11 through the diodes D16, D17, D18 and D19 which provide the proper polarity of DC voltage regardless of the connection of, or signal on, telephone line 11.

When the switch S1 is in the data mode, the presence of a ringing signal, a high a voltage AC signal of approximately 100 volts and 20 Hz, is detected by a ring detector circuit 60 in FIG. 2. The ring detector circuit 60 includes an optical isolator OP2 driven by a current supplied through resistor R3 and capacitor C1, and the reverse current is shunted by diode D2 connected across the light emitting diode (LED) input of the optical isolator OP2. The phototransistor within OP2 is biased by resistors R4 and R5. Load resistor R6 in parallel with capacitor C2 forms a circuit with a time constant substantially longer than the period corresponding to the frequency of the AC ring signal, thus providing an envelope signal of the ring signal at junction 23. This envelope signal is pulse-like, rising to a steady plateau value after the onset of the ring signal. When the ring signal ceases, the voltage at 23 falls to a quiescent value. The comparator U1 compares this envelope signal to a threshold voltage defined by R7 and R8 connected between the plus and minus power supplies, respectively. The output of U1, being open collector, requires a collector pull-up resistor R9. The comparator U1, having a high gain, produces a step-like transition at its output 24, which is connected to one input of NOR gate U2. The comparator U1 output 24 is also received by the base of transistor Q8 through a voltage divider formed by resistors R67 and R68. The emitter of transistor Q8 is connected ground and the collector is connected to −V through resistor R66. As the output 24 of comparator U1 goes to zero volts (when a ring signal is being detected), the transistor Q8 is turned off, allowing the collector potential to go to the −V supply potential in a sharp stop-like manner. This stop-like change in the transistor Q8 output produces (through capacitor C10 and across resistor R65) a decaying negative voltage pulse on the ring indicator (R1) lead 57, received by equipment 100 to indicate the presence of a ring signal on the telephone line 11.

The DTR detector circuitry 70 determines the presence of a DTR signal 54 under the condition of varying or undefined power supply potentials. Before the modem 10 is placed in an "off-hook" condition, its internal power supplies are not necessarily at their nominal plus and minus voltage values. In this case, it is necessary to measure the DTR signal compared to a specified fixed threshold, and then to translate the information to the rest of the automatic answer circuitry, whose plus and minus power supply voltage potentials may vary over a significant range. The DTR signal at lead 54 is received by the detector 70 through resistor R11 coupled to the emitter of transistor Q1. The emitter of Q1 is further connected to the common ground through a voltage limiting diode D3. The base of the transistor Q1 is also connected by resistor R12 to ground potential. The collector of the transistor Q1 is coupled to the base of transistor Q2 and to the positive power supply by resistor R13. The operation of this circuit topology with transistors Q1 and Q2 creates a switchable current source through the collector of transistor Q1 according to the Q1 emitter voltage changing relative to its base voltage, which has been established at zero volts through the resistor R12 connected to ground. Also, resistor R10, connected between the Q1 emitter to −V provides a no-answer state of the DTR signal (DTR lead pulled below zero volts) if the data equipment is not connected to the modem. Therefore, if the DTR signal drops below zero voltage, the transistor Q1 is energized, drawing current through the resistor R13 and the base emitter path of transistor Q2. When the DTR signal rises above zero, the transistor Q1 emitter voltage rises above that of the base voltage until diode D3 begins to conduct, at which time the transistor Q1 is effectively in a cut-off condition where no current flows through its collector. The diode D3 limits the voltage (base potential) to which the emitter may rise above zero volts. The transistor Q2 is turned on when the current flow through transistor Q1. When Q2 is on, it draws a current through resistors R14 and R15. When the transistor Q1 is in a cut-off condition, the resistor R13 causes the voltage of the transistor Q2 base to be substantially equal to that of the Q2 emitter voltage, so that transistor Q2 is in a cut-off condition, thereby eliminating the current flow through resistors R14 and R15. The voltage potential at the junction 62 of resistors R14 and R15 is compared by comparator U3 to a threshold voltage established at the junction 58 of resistors R16 and R17. Comparator U3 has gain characteristics similar to those described for U1. The output of comparator U3 is connected by series-connected load resistors R18 and R19 to the positive power supply voltage. When the DTR signal at least 54 is greater than zero volts, the junction 62 voltage between resistors R14 and R15 is less than the threshold voltage established by resistors R16 and R17 at junction 58 causing the U3 comparator output signal at 56 to have a voltage substantially equal to the negative power supply voltage. When the DTR signal is less than zero, the voltage at junction 62 will exceed that at junction 58, causing the comparator output 56 to be substantially equal to that of the positive power supply voltage. The DTR detector output 56 and the ring detector 60 output 24 signals are received by NOR gate U2 of answer control circuit 80.

The answer control circuit 80 engages the contact of the relay K1 by energizing of the set coil L1 thereof, placing the modem 10 in an "off-hook" condition. When both signals received by the NOR gate U2 are in a low state, the output of the NOR gate U2 rises from a digital low to a digital high state. A pulse forming network connected to the output 64 of U2 includes resistors R20, R22, R24, R26, and capacitor C3 to form a voltage divider across the positive and negative power supply voltages, where the voltage divider having an intermediate point defined by the U2 output 64. The junction 66 between resistors R20 and R22 will typically be slightly more positive than the junction 68 between the resistors R24, R26 and C3, thereby allowing the comparator U4 output 72 signal to have a local high level for all long-term quiescent conditions regardless of the logical state of NOR gate output 64 signal. An exception, occurring in a short-term condition after a transition from a high state to a low state, is produced by the addition of capacitor C3 between the junction 68 and the negative power supply voltage to form a circuit with a time constant defined by capacitor C3 and resistors R24 and R26. After loss of ring signal (resulting in a falling edge of the signal at 64) the signal at junction 68 will be more positive than the signal at junction 66 for a short time related to the time constant, causing the comparator U4 output 72 voltage to be close to the negative power supply voltage. The comparator U4, having an open-collector output 72, also requires a pull-up resistor R28. When the comparator U4 has a low output, the current for the comparator U4 output 72 signal will flow substantially through the base-emitter junction of transistor Q3. In turn, emitter current will flow through the winding L1 of relay K1, closing the relay K1 to a set position, and causing the modem to be connected in an "off-hook" condition. The diode D4 is connected across the winding L1 to suppress the transient voltage which occurs when the transistor Q3 is turned off. The relay K1, preferably a magnetic latching relay, requires only a short current pulse to place it in the set mode. The short current pulse length necessary is the result of the time constant created by capacitor C3 and resistors R24 and R26. This pulse occurs only after the high voltage ring signal on the telephone line has ceased which then allows the modem to go "off-hook". If the relay set current pulse were created during the high voltage ring signal modem, the components would be unnecessarily subject to high power stresses, thus shortening their expected life, or requiring more expensive components to be used. In addition, the output of comparator U5, connected in a wired-OR condition to the comparator U4 output 72, will close the relay K1 contacts when the operator uses the handset or telephone (connected to terminals 13 and 15 and when switch S1 is in the talk position) and a true or active DTR signal at 54 exists.

The detection of an "off-hook" condition of the telephone (not shown) connected to terminals 13 and 15 is formed by talk circuit 110. Diodes D21, D22, D23 and D24 provide a rectified DC current across resistor R1; the resistor R1 is chosen to develop at least enough voltage thereacross to excite the LED within the optical isolator OP1. Resistor R2 is chosen to limit the LED current when the voltage across R1 reaches its peak values. The receiving transistor of optical isolator OP1 is biased by resistor R70 connected to the transistor emitter, which provides a "TALK" signal indicating the "off-hook" condition of a telephone connected to terminals 13 and 15 by the telephone loop current drawn therethrough. The transistor collector of the optical isolator OP1 is connected to +V through resistor R71; the emitter is returned to −V through R72. The resulting TALK signal is received by comparator U5, which is connected to turn on transistor Q3, closing the relay K1 contacts when the telephone (not shown) is "off-hook."

The energy necessary to power the windings L1 and L2 (L2 discussed below) of the relay K1 through lead 53 is stored in capacitor C4 shown in FIG. 1. The energy stored therein accumulates from the DTR signal lead 54 over a long period of time through resistor R30 and diode D5. The negative side of capacitor C4 is connected to the negative power supply voltage lead, as signal conditions may exist wherein the negative power supply voltage, as charged by the TD, or "transmit data" signal, discussed below, may attain a potential farther below zero than the DTR signal, and thus provide a limited amount of charging potential through diode D5 and R30. If the DTR signal voltage is, in fact, lower than the negative supply voltage from capacitor C4, the flow of current is inhibited by diode D5. In addition, the positive power supply also may receive energy through resistor R32 and diode D6 when the DTR signal is in the logical high or "space" condition. When the modem goes into an "off-hook" condition, the relay windings L1 and L2 are powered through energy received from the modem power supply (which, in the "off-hook" condition, is powered from the telephone line 11) through diode D7, thereby eliminating the need for energy to be drawn by the answer circuit through the DTR line 54 or the transmit data TD line 38, as discussed below. Capacitor C7, connected between circuits 50 and 70, insures that capacitor C4 has some time to recharge (several seconds) by temporarily causing the output voltage on lead 56 to remain "true" for several seconds, regardless of a change of state of the DTR signal 54 after the modem 10 goes "off-hook."

In circuit 40, the negative potential of the power supply 32 of modem 10 receives energy from the DTR and the TD signals, respectively, when the modem is in an "on-hook" condition, through transistor Q4, which is biased into a conducting condition by causing base current to flow through resistor R36 from transistor Q5. Transistor Q5 functions as a switchable current source which draws a current through resistor R38 and which is turned on by a negative voltage at junction 76, located between diodes D9 and D10, and resistors R40 and R42. The DTR and TD signals can both supply energy to the negative power supply through diodes D15 and D8, respectively, when either or both of these signals are in a "mark" condition, or below zero volts relative to the signal ground. In addition, it is necessary to inhibit the charging function of the circuit during two conditions which may exist. The first of these conditions is where the modem receives power while in the "off-hook" condition. When this occurs, the "data set ready," or DSR, signal changes from a negative voltage to a positive voltage, causing the transistor Q5 to be biased into a cut-off condition. This also causes transistor Q4 to be cut-off, thereby inhibiting current flow through it to the minus power supply from the DTR and TD signals. When the DSR is in a low condition (indicating that the data set is not ready), transistor Q5 conducts and the energy from the DTR or TD signals will charge the negative power supply voltage. In a second condition, the charge to the negative power supply received through transistor Q4 is limited by Zener diode D11 when the DTR or TD signals may cause the total positive and negative power supply potentials to exceed the voltage ratings of the internal modem elements (which includes CMOS logic having an absolute maximum voltage rating of 18 volts).

According to the standard signaling procedure, a DTR signal transition from a high, or space state, to a low, or mark state, will cause the modem of the present invention to go "on-hook," or hang-up. This operation is implemented by the disconnect circuitry 50 in FIG. 2. The circuit 50 is activated by DTR signals received by comparator U10 through diode D12 from the DTR detector 70. The comparator U10 compares the DTR output signal on lead 56 according to a threshold voltage defined by resistors R46 and R48, connected to form a voltage divider across the positive and negative power supply potentials, respectively. Additionally, resistor R50 adds a predetermined amount of hysteresis to allow the output 78 of comparator U10 to have a sharp transition. The comparator output 78, being open collector (as those described above), requires a pull-up resistor R52 connected to the junction of the emitters of transistors Q6 and Q7. Transistor Q6 receives the output 78 of comparator U10 at its base input, and functions as an emitter follower. The emitter of transistor Q6 is connected to the emitter of complementary transistor Q7. The collector of transistor Q7 is connected to rest winding L2 of the relay K1. A reverse voltage diode D5 is connected across the winding to suppress reverse voltage transients which occur as the transistor Q7 turns off. When the calling station transmits a carrier which is in turn received by the modem 10, a carrier detect, or CD, signal on lead 51 is formed. If the calling party were to hand-up or to stop transmitting the carrier, the carrier detect signal 51 would change from a high to a low state, indicating a loss of "carrier detect." The modem hangs up upon the occurrence of loss of carrier detect, or CD, signal 51. It is desirable to delay approximately 15 seconds after loss of the carrier before causing the local modem 10 to go in an "on-hook" position. This lost carrier delay time is established by capacitor C5 and resistor R54, which produce a time constant sufficient to allow 15 seconds to elapse before the voltage which appears at comparator U10 input 82 crosses the threshold voltage established by resistors R46 and R48. In addition, resistor R56 allows the signal received at input 82 through diode D12, to be received independent of the state of the CD signal. Furthermore, capacitor C6 filters the CD signal 51 to remove spurious noise thereon. To prevent the condition of the winding L2 engaged when the modem is in an "on-hook" or hand-up condition, thereby draining the capacitor C4 of its energy which is needed to energize winding L1, the reset or disconnect circuit 50 is disabled by a low state of the data set ready, or DSR, signal. Therefore, the circuit 50 includes transistor Q7 to create a logic AND function between the logical high state of the DSR signal and the hang-up signal provided through comparator U10 and transistor Q6. It is therefore possible to hang-up or go "on-hook" only after previously going "off-hook," thereby eliminating the condition of continuous energizing of the reset winding L2 when the modem is "on-hook." The resistors R58 and R60 bias transistor Q7 to provide the appropriate change in conduction according to the signal received through the emitter of transistor Q7, which signal corresponds to the DSR signal. Additionally, it is necessary for the modem to hang-up when the DTR changes from a high to a low state. However, the transition of the DSR signal to a not ready state is coupled through capacitor C7 to the input 58 of comparator U3 of the DTR detector circuit 70 causes the DTR detector circuit output 56 to remain true after the modem 10 goes "off-hook" for at least 3 seconds, so that capacitor C4 may be recharged, and thus power the reset winding L2. Thereafter, the output at 56 comprises a rising signal which, when coupled to the input 82 of comparator U10 of hang-up circuit 50, causes output 78 signal to drop to a lower voltage. The lower voltage of output 78 signal causes transistor Q6 to conduct and the reset relay winding L2 will conduct, thus causing relay K1 contacts to open placing the modem in the "on-hook" condition. Although transistor Q7 is no longer driven by a signal through resistors R58 and R60, the condition of transistor Q7 is maintained by a signal stored on capacitor C9 allowing transistor Q6 to drive the reset winding C2.

The answer/originate mode selection circuit 90 in FIG. 1 provides an answer/originate mode selection signal on lead 92 which in turn selects the group of modem communications carried frequencies and the respective answer or originate mode in which respective communicating modems are operated. To originate a call, the operator must first engage switch S1 in the talk position and manually establish the communication link by proper dialing sequences according to known telephone format standards. It is only after the telephone circuit is established that the modem may initiate the data transfer. Therefore, to place the modem in the originate mode according to the present invention, the telephone circuit at terminals 13 and 15 must first be completed for a period of time before the modem circuit is engaged (placing switch S1 in the data mode). Signals corresponding to the above sequence of telephone and modem operation have been derived according to the present invention, when taken together in a logical combination, form a signal determining the answer-/originate mode. The signals are, first, whether or not the data set or the telephone set is in an "off-hook" condition and, second, the position of the switch S1. This first signal is generated as follows. When in the "on-hook" position, relay K1 is open, causing the normal telephone line DC voltage to accumulate on capacitor C8 through resistor R62 and diode D14. When the relay K1 contacts are closed, the first signal is generated by the discharge of capacitor C8. A telephone "off-hook" detector circuit 110 in combination with DTR detector output at 74 and the answer control circuit 80, engages the relay K1 contacts when the telephone set connected to terminals 13 and 15 is in the "off-hook" condition, typically when the user is dialing and establishing the telephone circuit; also, as described above, the answer control circuit 80 closes the relay K1 contacts when the switch S1 is in the data mode, that being typical of the answer mode connection. Therefore, the contacts of relay K1 changes from an open to a closed condition regardless of the position of switch S1 as long as either the modem or the telephone are connected. The signal provided as a result of the closure of relay K1 contacts is the negative going pulse at 94 which, as attenuated by resistors R64 and R66, is inverted in logical transition by NAND gate U6 whose output 96 is received by NOR gate U7. Since the signal formed at 94 is a result of the discharge of capacitor C8 through resistor R62 and diode D14, the signal at 94 is in the form of a decaying pulse. Therefore, the signal at 96 is a positive going pulse of finite duration. The other input 98 of NOR gate U7 only affects the state of the output 102 when the input at 96 is in a low state; therefore, the answer/originate switch S2 signal at 98 is read by gate U7 only when the logic level at input 96 is in a logic low state. If the switch S2 provides a low logic state at 98, the positive logic pulse at 96 results in a negative pulse at the output 102 which is received by the data input of flip-flop U8. The data is stored by the flip-flop U8 and read at the $\overline{Q}$ output 92 as the answer-/originate signal, which determines the answer/originate mode of the modem. The data is clocked in to the flip-flop U8 by a clock signal generated at 104 by an inverter formed from a NAND gate U9 whose input occurs only during the start-up transition of the modem. This clock signal on lead 104, which comprises the second of the above-mentioned sequence signals, is formed by capacitor C9 connected to the positive potential power supply, and by resistor R68 and diode D15 which provide a charge path for the capacitor C9 to ground. Therefore, the inverter U9 signal output at 104 is a positive going pulse of a finite duration according to the time constant defined by resistor R68 and capacitor C9. Since the start-up pulse only occurs when a power supply voltage is applied, which in turn occurs only when the switch S1 is in a data mode, the switch S1 position information is in turn translated into a power start-up signal as a clock signal at 104 into the clock input of flip-flop U8. Therefore, if the signal at 94 occurs (indicating an "off-hook" condition) just before the power start-up signal on the signal 104 occurs, the positive signal at lead 96, converted to a negative signal at 102, is stored in the flip-flop 108 and is received by the modem as a positive logic level on lead 92 as a modem mode control signal in the answer state. This positive logic level corresponds to the simultaneous occurrence of an "off-hook" condition and the engagement of the modem, as would normally occur when the modem itself automatically answers an incoming ringing signal. The position of the answer/originate mode select switch S2 is disregarded by the operations of the NOR gate U7 when the sequence of events occurs in the above-described answer sequence. When the "off-hook" signal at junction 94 occurs sufficiently early in time with respect to the power start-up signal on lead 104, as would be the case when the user is manually dialing the number by the use of the telephone (connected to terminals 13 and 15) before placing the switch S1 in the data mode, the signal at 96 is low and thus enables the gate U7 to receive the signal from switch S2 to determine the state of the answer/originate modem mode control signal 92. It is also possible, according to the position of switch S2 and the prior occurrence of "off-hook" signal at 94, to select a logical high or low state corresponding to the answer or originate mode in which the modem 10 is to operate. After the modem is placed in an "on-hook" condition, the capacitor C8 begins to recharge through resistors R64 and R66, to become reset in anticipation of another sequence of use.

The invention is not to be limited by what has been shown according to the above embodiment and is not to be limited except as indicated by the appended claims.

What is claimed is:

1. For use in a modem powered by the telephone line and connected to data equipment which sends a data equipment modem answer control signal having an answer state when ready to receive data and a no-answer state when not ready to receive data;

an automatic answer device operative upon receipt of a ring signal from said telephone line when said modem answer control signal is in said answer state to place said modem in the answer mode (off-hook) and to pass data received by said modem to said data equipment, said automatic answering device comprising;

a ring detector means generating a ring indicator signal when said ring signal appears on said telephone line;

an answer relay for connecting said modem to said telephone line according to a relay answer signal;

energy storage means for receiving and storing said modem answer control signal; and an answer control means connecting said answer relay and said energy storage means for producing said relay answer signal upon the receipt of said ring indicator signal when said modem answer signal is in said answer state for causing actuation of said answer relay from said storage means thereby connecting said telephone line to said modem.

2. An automatic answer device of claim 1 wherein said energy storage means is connected to receive energy from said telephone line when the modem is in the answer mode.

3. An automatic answer device of claim 2 wherein said energy storage means further receives and stores a data signal from said data equipment, said data signal being that of information to be transmitted from said data equipment onto said telephone line.

4. An automatic answer device of claim 1 wherein:

said answer relay is a latching relay having a characteristic of connecting and disconnecting said telephone line and said modem without continuous sustaining power;

said ring signal comprises a periodic sequence including an active period and a silent period; and said answer control means limits said relay answer signal to a pulse beginning during said silent period of said ring signal.

5. An automatic answer device of claim 1 wherein said modem further includes an originate mode being selectable according to a mode control signal having an answer state and an originate state, said automatic answer device further includes:

a handset circuit including a telephone;

a line switch connected to include one of said modem including said answer relay and said handset in a circuit with said telephone line, said line switch being operated to connect said telephone, which in an off-hook condition is used to generate signals on said telephone line to establish the telephone circuit, thereafter said line switch being operated to include said modem;

a line current detector providing a detected current signal when said handset circuit is in said off-hook condition, said detected current signal being received by said answer control means to produce said relay answer signal to actuate said answer relay; and a mode control means generating said mode control signal, said mode control signal being in the originate state when said detected current signal precedes said relay answer signal and said mode control signal being in said answer state otherwise.

6. An automatic answer device of claim 5 further including a mode selector connected to said modem to select said originate mode or said answer mode, said mode selector determining said mode when said mode control signal is in said originate state.

7. An automatic answer device of claim 4 wherein said answer relay is operable to disconnect said modem from said telephone line according to a disconnect signal, said automatic answer device further comprising a disconnect control means generating said disconnect signal whenever said modem control signal is in said no-answer state.

8. An automatic answer device of claim 7 wherein said modem includes a carrier detect means providing a carrier detect signal upon receipt of a remote station connected to and communicating through said telephone line to said modem, said disconnect control means receiving said carrier detect signal and producing said disconnect signal upon the absence of said carrier detect signal, wherein said disconnect signal is delayed according to a predetermined lost carrier delay time.

9. An automatic answer device of claim 7 wherein said disconnect signal is a pulse signal to cause said answer relay to disconnect said modem from said telephone line only after said answer relay connects said telephone line to said modem.

* * * * *

UNITED STATES PATENT AND TRADEMARK OFFICE
CERTIFICATE OF CORRECTION

PATENT NO. : 4,415,774
DATED : November 15, 1983
INVENTOR(S) : R. Byron Driver

It is certified that error appears in the above—identified patent and that said Letters Patent is hereby corrected as shown below:

Column 2, line 36, "tramsmission" should read --transmission--;
line 63, "of" should read --for--.
Column 3, line 25, "With the switch" should read --With switch--;
lines 64-65, "appearing the" should read --appearing across the--.
Column 4, line 2, "a high a voltage" should read --a high voltage--.
Column 5, line 23, "least" should read --lead--;
line 49, "local" should read --logical--.
Column 7, line 62, "rest" should read --reset--.
Column 8, line 1, "hand-up" should read --hang-up--;
line 19, "hand-up" should read --hang-up--;
line 58, "carried" should read --carrier--.
Column 9, line 5, "invention, when" should read --invention which, when--.

Signed and Sealed this

Sixth Day of March 1984

[SEAL]

Attest:

GERALD J. MOSSINGHOFF

Attesting Officer   Commissioner of Patents and Trademarks